United States Patent

[11] 3,607,645

| [72] | Inventor | Raymond S. Stankiewicz<br>Ellington, Conn. |
|---|---|---|
| [21] | Appl. No. | 741,960 |
| [22] | Filed | July 2, 1968 |
| [45] | Patented | Sept. 21, 1971 |
| [73] | Assignee | The United States of America as represented by the United States Atomic Energy Commission |

[54] REACTOR CORE RADIAL LOCKING DEVICE
3 Claims, 2 Drawing Figs.

[52] U.S. Cl. ............................................. 176/87,
165/81, 176/85
[51] Int. Cl. ...................................................... G21c 19/06
[50] Field of Search ............................................. 176/85, 87;
165/53, 81, 82

[56] References Cited
UNITED STATES PATENTS
2,998,370  8/1961  Gaunt et al. .................. 176/85

| 3,215,608 | 11/1965 | Guenther ...................... | 176/87 |
| 3,248,299 | 4/1966 | Junkermann et al. ........ | 176/85 |
| 3,260,650 | 7/1966 | Kalk et al. ...................... | 176/85 |

FOREIGN PATENTS

| 875,191 | 8/1961 | Great Britain................ | 176/85 |

*Primary Examiner*—Reuben Epstein
*Attorney*—Roland A. Anderson

ABSTRACT: A nuclear reactor core-locking device which holds the fuel assembly loosely for refueling and tightly against vibration or other adverse movement under operating conditions. A core-retainer band surrounds and is spaced from the core at assembly. The retainer band is made from material having a lower coefficient of thermal expansion than the core structural material so that when operating temperatures are reached the core expands into contact with the band and becomes effectively locked into place.

PATENTED SEP 21 1971

3,607,645

RADIAL CLEARANCE
0.25 in. COLD
0.0 in HOT

*INVENTOR.*
RAYMOND S. STANKIEWICZ
BY
*Roland A. Anderson*

REACTOR CORE RADIAL LOCKING DEVICE

The invention described herein was made in the course of or under a contract with the United States Atomic Energy Commission.

BACKGROUND OF THE INVENTION

In a typical nuclear reactor employing bundles of fuel assembled into a core and provided with liquid cooling, temperatures are capable of fluctuating widely, for example, between 300° to 375° E. at refueling and 900° to 1,100° F. during normal operating conditions. Due to the presence of variable temperature gradients with consequent differential thermal expansion throughout the core and the effect of coolant flow and some turbulence, there is a tendency for vibrational effects to be induced by the combination of looseness of parts throughout the core with high-velocity coolant in various locations throughout the core. In the long run, the fuel bundles are subject to bowing and other adverse effects which decrease significantly the useful lifetime of the fuel between refueling.

SUMMARY OF THE INVENTION

The present invention overcomes the aforementioned difficulties in a nuclear reactor utilizing a core consisting of fuel bundles by relying on differential thermal expansion as the reactor reaches normal operating conditions to lock the various elements of the core into place so that vibration due to coolant flow will not be induced during normal operation.

In accordance with this invention a core band or cylindrical sleeve is introduced into the core which as temperatures approach normal operating conditions will lock the elements against movement as a result of differential thermal expansion between the core structural material and that of the band.

It is thus a principal object of this invention to provide an improved core structural arrangement which permits looseness to facilitate refueling and a tight configuration during normal operating conditions.

DESCRIPTION OF THE PREFERRED EMBODIMENT

Figure 2:
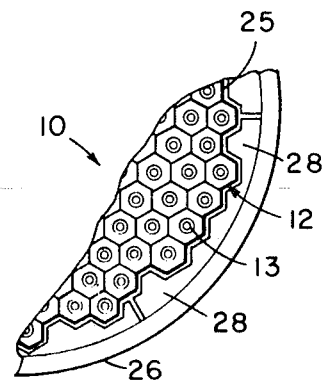
FIG. 2 is a partial plan view of the core shown in FIG. 1.
Figure 1:
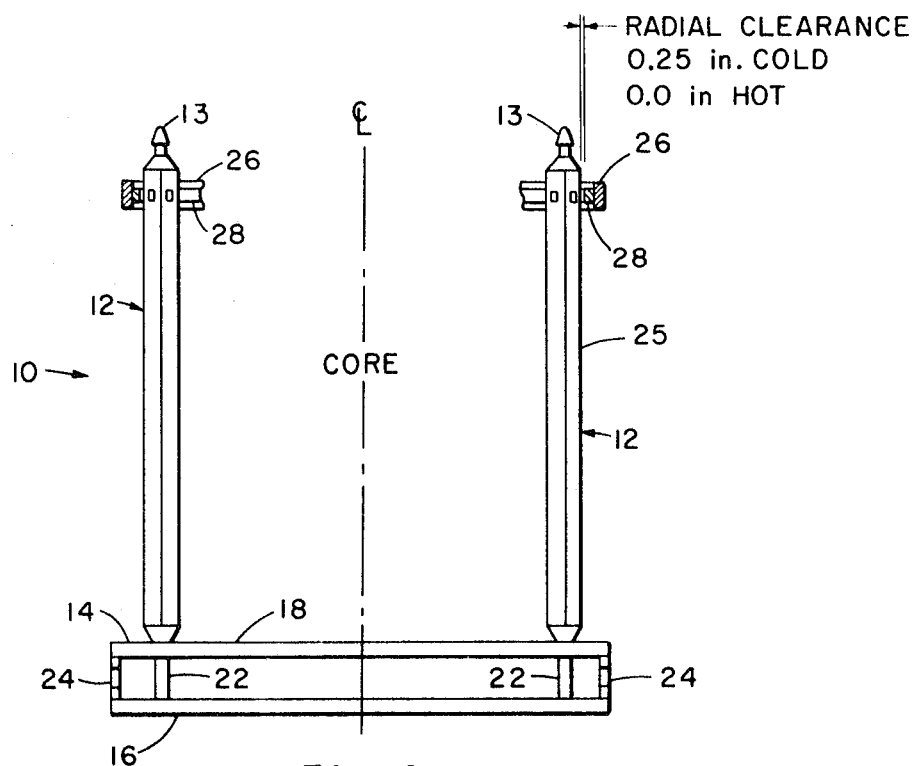
FIG. 1 is an elevation view of a portion of a core embodying the principles of this invention.

Referring to FIGS. 1 and 2, nuclear reactor core 10 consists of an assembly of hexagonal fuel bundles 12 which rest on a core support structure 14 consisting of a pair of circular plates 16 and 18 with spacer members 22, 24, and others not shown for rendering structure 14 rigid and strong enough to support fuel bundles 12. As is understood in the art, while only two bundles 12 are illustrated in FIG. 1, a relatively large number of bundles 12 are assembled as shown in FIG. 2, each bundle at its lower end fitting into a slot or opening (not shown) in plate 18 to maintain alignment at the lower end. Each of fuel bundles 12 consists of an outer casing 25 made from a suitable structural material, and is filled with fissionable material as known in the art, coolant flowing through the interior of each bundle 12 for carrying away the heat of fission. While not shown, a similar grid structure would be located at the upper end of core 10 to anchor the upper ends of fuel bundles 12. Lower grid structure 18 as well as the upper grid structure (not shown) would be provided with suitable openings to permit flow of coolant to enter and leave fuel bundles 12.

Surrounding the assembly of fuel bundles 12 near the upper portion thereof is a core band 26 which along the inside diameter thereof are attached such as by welding a plurality of segmented filler plates 28 which have a honeycomb inner edge to match the circumferential shape of the assembly of fuel bundles 12. The material from which band 26 and plates 28 are constructed has a coefficient of thermal expansion which is less than the mate l used for the core structural material of outer casings 25.

As a result of this construction, during the initial assembly period, or when reactor operation is reduced for refueling, temperature of the reactor is at a relatively low value, such as 300°-375° F. At this temperature, segmented filler plates 28 are not in contact with any of fuel bundles 12 as seen in the figures which thus are in a generally loose condition thereby making it convenient to remove and replace any selected ones. When reactor 10 comes up to normal operating conditions and temperatures increase substantially, as for example, up to 900°–1,100° F., less thermal expansion takes place in band 26 than within the assembly of fuel bundles 12 so that filler plates 28 come into contact with the outer row of bundles 12 with the result that fuel bundles 12 are in effect locked firmly in place against vibration and bowing during normal operation.

Band 26 is constructed from a material of low coefficient of thermal expansion such as a suitable titanium or vanadium alloy, providing coefficient of thermal expansion values in the range of 5 to $6 \times 10^{16}$ in/in. ° F. relative to that of stainless steel ($9 \times 10^{1a'}$ in./in.° F.) used for outer casings 25. The relative radial movement which can be provided by the device is
$DR = (\alpha_c - \alpha_b) R \Delta t$
where:
$DR$ = relative radial movement (in.)
$\alpha_c$ = coefficient of thermal expansion of core (in./in.° F.)
$\alpha_b$ = coefficient of thermal expansion of band (in./in.° F.)
$\Delta R$ = average radius of core-band interface (in.)
$\Delta T$ = net change in temperature (° F.)

Thus, to be effective $\alpha_b$ must be smaller than $\alpha_c$. Relative radial movement is proportional to the radius of the core and net temperature change.

Examples of suitable titanium and vanadium alloys for use in making band 26 are (1) 80 percent by weight vanadium; (2) 77.5 percent vanadium, 7.5 percent chromium; (3) 5 percent aluminum; 2.5 percent tin; (4) 7 percent aluminum, 4 percent molybdenum; and (5) 13 percent vanadium, 11 percent chromium, 3 percent aluminum; the balance for each of these alloys being titanium.

It is thus seen that there has been provided an arrangement for clamping or locking in place fuel within a nuclear reactor while at the same time permitting a degree of looseness at times of refueling so as to render fuel replacement convenient and feasible.

While only a preferred embodiment of the invention has been described it is understood that many variations are possible without departing from the principles of this invention. For example, the core band may extend as a sleeve for the full length of the core. Hence the invention is to be defined by the scope of the appended claims.

I claim:

1. A clamping arrangement for a nuclear reactor core containing a plurality of fuel bundles comprising:
    a. means for anchoring the ends of said fuel bundles;
    b. retainer-band means surrounding and spaced from said bundles when at temperatures below that of operating temperature for said reactor;
    c. The material selected for said band means having a thermal coefficient of expansion less than the casing structural material selected for said fuel bundles, the spacing of said fuel bundles from said band means being such that the former come into contact with and are clamped together by said retainer-band means as the temperature of said reactor approaches normal operating conditions.
2. The clamping arrangement of claim 1 in which said retainer-band means includes filler plates along the inner circumference thereof which plates come into contact with the outer row of said fuel bundles.
3. The clamping arrangement of claim 2 in which the material for said band means is a titanium alloy selected from the group consisting of 80 percent by weight vanadium; 77.5 percent chromium; 5 percent aluminum, 2.5 percent tin; 7 percent aluminum, 4 percent molybdenum; and 13 percent vanadium, 11 percent chromium, 3 percent aluminum, the remaining material in each alloy being titanium.